(12) United States Patent
Narayanan et al.

(10) Patent No.: US 8,437,619 B2
(45) Date of Patent: May 7, 2013

(54) METHOD OF PROCESSING A SEQUENCE OF CODED VIDEO FRAMES

(75) Inventors: Muralidharan Narayanan, Bangalore (IN); Christopher S. Del Sordo, Souderton, PA (US); Surya P. Maheswaram, Hydernagar (IN); Krishna Prasad Panje, Bangalore (IN); Ernest G. Schmitt, Maple Glen, PA (US); Yaxi Zhang, Wayne, PA (US)

(73) Assignee: General Instrument Corporation, Horsham, PA (US)

( * ) Notice: Subject to any disclaimer, the term of this patent is extended or adjusted under 35 U.S.C. 154(b) by 308 days.

(21) Appl. No.: 12/973,257

(22) Filed: Dec. 20, 2010

(65) Prior Publication Data

US 2012/0155833 A1 Jun. 21, 2012

(51) Int. Cl.
*H04N 9/88* (2006.01)
*H04N 9/80* (2006.01)

(52) U.S. Cl.
USPC .......................................... 386/263; 386/240

(58) Field of Classification Search .................. None
See application file for complete search history.

(56) References Cited

U.S. PATENT DOCUMENTS

| | | | |
|---|---|---|---|
| 5,703,877 A * | 12/1997 | Nuber et al. ............. | 370/395.64 |
| 5,765,164 A | 6/1998 | Prasad et al. | |
| 6,081,299 A | 6/2000 | Kesselring | |
| 2007/0280301 A1 * | 12/2007 | Yamanaka ..................... | 370/503 |
| 2007/0286577 A1 * | 12/2007 | Kato et al. ..................... | 386/95 |
| 2008/0007653 A1 * | 1/2008 | Mori et al. ..................... | 348/462 |
| 2010/0208856 A1 * | 8/2010 | Fuchikami et al. ........... | 375/371 |

FOREIGN PATENT DOCUMENTS

| | | |
|---|---|---|
| EP | 940986 A2 | 9/1999 |
| EP | 1162828 A2 | 12/2001 |
| EP | 1439700 A1 | 7/2004 |
| EP | 1447986 A1 | 8/2004 |
| WO | 2004056126 A1 | 7/2004 |

OTHER PUBLICATIONS

PCT Search Report & Written Opinion, Re: Application #PCT/US2011/065008, Dec. 13, 2012.

* cited by examiner

*Primary Examiner* — Gelek W Topgyal
(74) *Attorney, Agent, or Firm* — Stewart M. Wiener

(57) ABSTRACT

A method of modifying a digital data stream composed of a sequence of frames, where each frame represents an image and includes a data field specifying a presentation time stamp value for the frame. If there is a discontinuity in presentation time stamp value between a next frame and a first frame, a value representing a stream time stamp of interest is assigned to a variable for representing the value of the stream time stamp of interest at a point of discontinuity in presentation time stamp, and a value of the presentation time stamp is assigned to a variable for representing the first frame's clock time based on presentation time stamp, and the next frame is stored in a database using as an index the value representing a stream time stamp of interest.

8 Claims, 4 Drawing Sheets

METHOD OF PROCESSING A SEQUENCE OF CODED VIDEO FRAMES

BACKGROUND OF THE INVENTION

The subject matter of this patent application relates to a method of processing a sequence of coded video frames. The method of processing allows the coded frames to be retrieved during playback in an unambiguous manner.

A television programming provider typically produces a programming signal for distribution by a service provider (such as a cable system operator) over a video transmission network to a wide audience of viewers. Conventionally, the programming signal begins as an uncompressed video sequence and at least one corresponding uncompressed audio sequence. The subject matter of this application is concerned with processing the video sequence and accordingly we will not discuss the audio sequence further.

The uncompressed video sequence consists of a series of sequential frames, representing respective images, and is assembled at a production facility. After assembly, the uncompressed video sequence is compressed by a video encoder, which encodes each frame using a video compression algorithm, such as that which is commonly known as MPEG-2, and creates a corresponding compressed video frame. The coded video sequence is transmitted over a transmission network to customer premises at which a video decoder included in a receiving terminal decodes the video sequence for a selected program and supplies the decoded frames to a television set for presenting the corresponding sequence of images to the viewer.

The MPEG-2 video compression algorithm encodes an uncompressed video frame as an intra-coded frame, or I frame, as a predictive-coded frame (P frame) or as a bi-directionally predictive-coded frame (B frame). I frames and P frames are also known as reference frames or anchor frames whereas B frames are also referred to as dependent frames. An I frame contains a complete description of the original picture. A P frame contains a description of the picture compared to a temporally earlier I frame. This allows the encoder to use considerably fewer bits to describe a P frame than would be required for an equivalent I frame. A B frame contains a description of the picture compared to both a temporally earlier reference frame and a temporally later reference frame. This allows the encoder to use approximately an order of magnitude fewer bits to describe a B frame than an equivalent I frame. It will therefore be appreciated that a P frame is both a dependent frame (with respect to an I frame) and a reference frame (with respect to a B frame).

Each coded frame includes, in addition to data representing the captured image, a presentation time stamp. The presentation time stamp, or PTS, is a 33 bit value of the count attained by counter that is counting cycles of a 90 kHz system clock signal. The PTS value reflects the desired playout-time of the frame relative to the system clock.

The sequence of coded frames is input to a system encoder which encapsulates the coded frames in packets (such as packetized elementary stream packets, which are well known to those skilled in the art) that can be efficiently transmitted over suitable communication infrastructure to a receiving terminal that includes a video decoder.

Generally it is intended that the frames should be presented for display in the same order as the corresponding images were acquired, for example by a camera. For each uncompressed video frame, the video encoder determines the appropriate type of the corresponding coded video frame and the coded frame's place in the encoding order. The encoder may determine that a first frame (F1) should be coded as a reference frame (I or P). In this case, the next two frames (F2, F3) will normally be encoded as B frames and the fourth frame (F4) as a P frame. The encoder will first encode frames F1 and F4 and then encode frames F2 and F3 using the encoded frames F1 and F4 as reference frames. The encoder transmits the frames in the sequence F1, F4, F2, F3.

Let us assume that frame F1 is encoded as an I frame. Since a dependent coded frame depends on at least one reference frame, the decoder must decode the reference frame(s) before the dependent frame can be decoded. Therefore, although the coded frames are transmitted, and subsequently decoded, in the encoding order F1, F4, F2, F3, the downstream receiving terminal may not simply output the decoded frames in the order they are received. For coded frames transmitted earlier in the sequence than they are to be displayed, the system encoder inserts a decode time stamp (DTS), relative to the system time clock, into the coded frame's packet in addition to the PTS. For those frames for which no reordering is necessary, the DTS and PTS would be identical and therefore only the PTS is transmitted and the PTS is used to determine the decode time.

The receiving terminal operates in known fashion to generate a system clock signal that is synchronized to the encoder's system clock signal. A receiving terminal with minimal functionality, such as a simple set-top box (STB) without recording capability, comprises a receiver that recovers the sequence of coded video frames from the packetized elementary stream and a video decoder that receives coded the video frames, buffers and decodes the frames based on DTS, and buffers and presents the frames based on PTS.

Many subscribers to cable and satellite television distribution services use a more sophisticated receiving terminal that incorporates a PVR (personal video recorder) to record television program material for later playback and viewing. In this case, the video frames are stored in coded form and are decoded and played back when desired in a similar manner to that employed by the simple STB described above.

A typical PVR supports various trick playback modes, including fast forward (FF) and rapid reverse (RR), which allow a viewer to scan rapidly through material of little interest. The PVR accomplishes FF and RR playback by discarding frames of the received sequence, i.e. by omitting frames of the received sequence from the sequence that is decoded and supplied to the video display buffer. The PVR displays frames at the normal constant rate (i.e. about 30 frames per second in the United States) but since frames of the received sequence are discarded, the displayed image evolves at a greater speed than in normal playback.

The uncompressed video sequence that is compressed by the video encoder may include feature content, such as an episode of a recurring television program, interspersed with supplemental content blocks (e.g. one or more commercials, public service announcements, station identification messages, etc.). At the production facility, the programming provider uses conventional video editing techniques to insert the supplemental content blocks into the feature content at predetermined intervals.

The supplemental content blocks that are inserted into the uncompressed video sequence at the production facility typically take the form of a series of video sequences having relatively short duration (e.g. 8 distinct video sequences each having a duration of 30 seconds or 1 minute). As part of a commercial arrangement between the programming provider and the service providers, some advertising content blocks may contain some low priority advertising content, such as advertisements provided by the national television network itself. This allows the regional or local service providers to overwrite the low priority advertising content in the programming signal with their own local or more specifically targeted advertising content in the form of sequences of coded video frames. This 'ad-insertion' capability is advantageous for the service providers because they can provide targeted advertising content specifically aimed at their customer base.

However, insertion of advertising content blocks in the sequence of coded video frames may result in discontinuities in timestamps (PTS and DTS).

When the coded video sequence content is decoded and presented as received, as by the simple STB described above, the discontinuities in timestamps are hidden. However, when the coded video sequence material is recorded by a PVR and played back later, and the user wishes to use trick play capabilities, several undesirable effects may be observed. In particular, it is difficult for the PVR to select the correct video frames and send them to the decoder when there are discontinuities in the time stamps. Further, pausing and subsequently resuming at the previously paused frame is difficult to achieve, and so is slow forwarding frame by frame, in the case of content with discontinuous time stamps.

More sophisticated receiving terminals (with PVR capability) are subject to limited control by the service provider (such as a cable system operator), allowing the service provider to store supplemental content for later insertion into a video stream being played back and displayed. For example, the service operator may cause the receiving terminal to ingest advertising material from the internet for subsequent play out. In most cases, such material is ingested at non-real time speeds.

It has been proposed that a PVR should store the coded video frames in the mass storage device using a relational database having a content file and an index file. In an implementation of this proposal, the PVR receives the video frames and assigns a local frame time stamp (LFTS) to each frame, stores the video frames in the content file along with content offset position (the record number of the frame in the content file) to identify the location of the frame in the content file, and stores the LFTS in the index file along with the PTS and offset information to identify the location. On playback, the DVR uses the PTS to retrieve an LFTS from the index file and then uses the retrieved LFTS to determine the temporal position and offset of the relevant video frame from the content file (so as to recreate the sequence of frames as received), buffers and decodes the retrieved frames based on DTS, and buffers and presents the decoded frames based on PTS.

One problem with this known DVR is that when an ad is inserted, the frames of the ad have their own sequence of PTS values so there is an interruption in the sequence that started at the beginning of the program. Another is that during trick play the PTS values are not continuously increasing.

Use of a local frame time stamp in this manner is not optimum because PTS discontinuities may result from reusing of PTS values by multiple programs and interleaving of different video streams.

Moreover, this approach is not helpful when recording happens at non real-time speeds, as discussed above, because the LFTS value is based on an operating system clock tick in the set-top box and not on the real time of the video stream. Thus, the temporal position based on LFTS value may not be accurate.

SUMMARY OF THE INVENTION

In accordance with a first aspect of the subject matter disclosed herein there is provided a method of processing a sequence of coded video frames conveyed by a digital data stream, where each frame represents an image, comprising a. receiving the sequence of coded video frames at a recording device, b. determining a frame interval between presentation of an ith coded frame of the sequence and an (i+1)th coded frame of the sequence, c. at the recording device, calculating a stream time stamp for the ith coded frame, and d. at the recording device, calculating a stream time stamp for the (i+1)th coded video frame based on the stream time stamp for the ith coded video frame and the frame interval determined in step b.

In accordance with a second aspect of the subject matter disclosed herein there is provided a method of modifying a digital data stream composed of a sequence of frames, where each frame represents an image and includes a data field specifying a presentation time stamp value for the frame, comprising a. initializing a variable Int_fr with a frame interval value based on a nominal frame rate; b. receiving a first frame and reading the presentation time stamp value of the frame, assigning the presentation time stamp value of the first frame to a variable PTS, assigning a value of the variable PTS to a variable Clock_start for representing the first frame's clock time based on presentation time stamp, assigning a value of the variable PTS to a variable Clock_pts for representing a frame's clock time based on presentation time stamp, assigning a value zero to a variable ST* for representing a stream time stamp of interest; c. receiving a next frame and reading the presentation time stamp value of said next frame, assigning the presentation time stamp value of said next frame to the variable PTS, assigning a value (PTS−Clock_pts) to a variable Diff, assigning a value PTS to the variable Clock_pts, and assigning a value (ST*+Int_fr) to the variable ST*; and d. testing whether there is a discontinuity in presentation time stamp value between said next frame and the previous frame and, if so, assigning a value ST* to a variable ST_dis* for representing the value of the stream time stamp of interest at a point of discontinuity in presentation time stamp and assigning a value PTS to the variable Clock_start and storing said next frame in a database using the value of ST* as an index.

In accordance with a third aspect of the subject matter disclosed herein there is provided a video recording device for processing a sequence of coded video frames conveyed by a digital data stream, where each frame represents an image, the video recording device having an input terminal for receiving the digital data stream and comprising a computing machine programmed to perform the steps of a. determining a frame interval between presentation of an ith coded frame of the sequence and an (i+1)th coded frame of the sequence, b. calculating a stream time stamp for the ith coded frame, and c. calculating a stream time stamp for the (i+1)th coded video frame based on the stream time stamp for the ith coded video frame and the frame interval determined in step b.

In accordance with a fourth aspect of the subject matter disclosed herein there is provided a non-transitory computer-readable storage medium containing software which, when read and executed by a computing machine receiving a sequence of coded video frames conveyed by a digital data stream, where each frame represents an image, causes the computing machine to perform a method that comprises a. determining a frame interval between presentation of an ith coded frame of the sequence and an (i+1)th coded frame of the sequence, b. calculating a stream time stamp for the ith coded frame, and c. calculating a stream time stamp for the (i+1)th coded video frame based on the stream time stamp for the ith coded video frame and the frame interval determined in step a.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
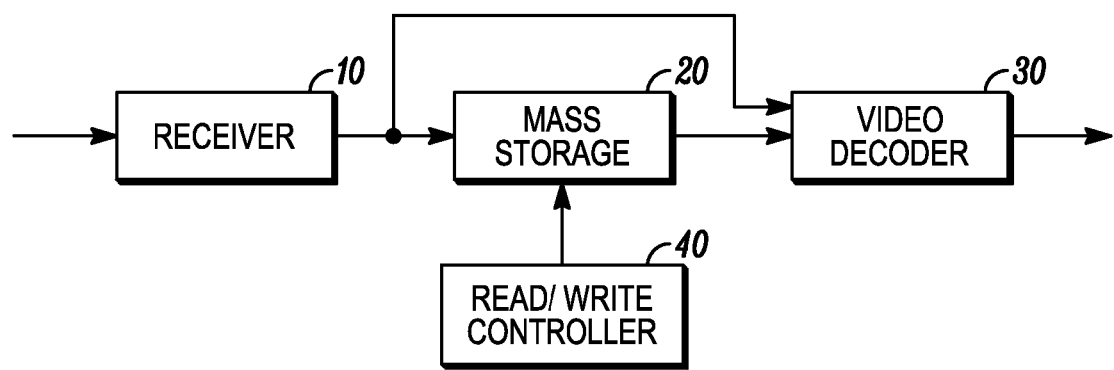
FIG. 1 is a schematic block diagram of a receiving terminal.

Referring to FIG. 1 of the drawings, a receiving terminal implemented as a PVR receives a stream of digital data conveying a sequence of video frames encoded in accordance with the MPEG-2 video compression algorithm. The terminal includes a receiver 10, mass storage 20, and a video decoder 30. The receiver receives the bitstream provided by the service provider and recovers the sequence of coded video frames. A read/write controller 40 writes the video frames into memory that is implemented by the mass storage section and is organized as a relational data base comprising a content table and an index table. The read/write controller implements a time stamping algorithm that uniquely identifies each video frame and generates time stamps for each video frame in the receiving sequence. This allows the video frames to be read from memory for decoding and presentation in the correct order without regard to discontinuities in PTS.

Figure 2:
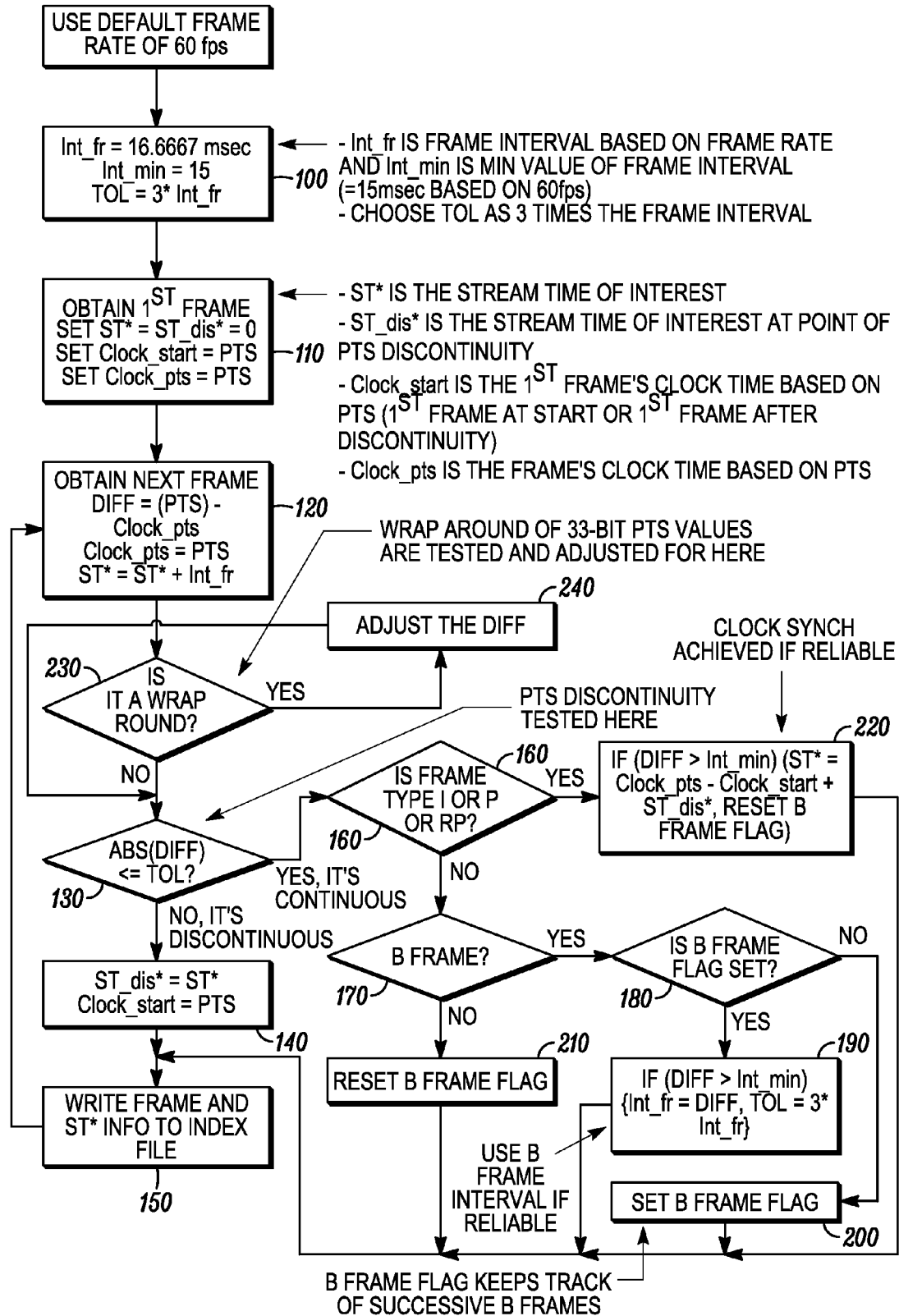
FIG. 2 is a flow chart of an algorithm that is executed by the receiving terminal shown in FIG. 1 during recording of a sequence of coded video frames.

FIG. 2 illustrates a flowchart of the time stamping algorithm. The time stamping algorithm is initialized (step 100) by assigning an initial value to a variable Int_fr, which represents the frame interval of the video frames. The initial value is calculated from a default value of the frame rate. Assuming a frame rate of 60 frames per second, the initial value that is assigned to Int_fr is 16.6667 ms. The value assigned to Int_fr may subsequently be adjusted when B frames are received, as discussed in detail below. The algorithm assigns a value of 15 ms to a variable Int_min (minimum value of the frame interval) and assigns a value of 3*Int_fr to a variable TOL (tolerance).

After initialization, the time stamping algorithm receives the presentation time stamp of the first frame of the sequence of video frames from the receiver (step 110) and assigns this value to a variable PTS. The presentation time stamp of the ith frame in a continuous sequence of frames is a 33 bit number representing the number of ticks of a 90 kHz clock starting from an initial value (which generally will not be zero) at the start of the sequence.

The stream time stamp is also considered as a 33 bit number representing the number of ticks of a 90 kHz clock. In step 110 the algorithm assigns the value zero to a variable ST* (stream time stamp of interest), signifying that the stream time stamp starts with zero for the first frame of the sequence. The algorithm also assigns the value zero to a variable ST_dis * (stream time stamp of interest at a point of discontinuity in presentation time stamp). The algorithm assigns the clock value of PTS both to a variable Clock_start (clock time of the first frame based on presentation time stamp) and to a variable Clock_pts (clock time of current frame based on presentation time stamp). Clock_start thus represents the presentation time stamp of the first frame of the sequence that is being recorded.

In step 120 the algorithm receives the next frame and assigns the presentation time stamp of the current frame to the variable PTS and assigns the value (PTS–Clock_pts) to a variable Diff. Thus, the variable Diff represents the difference between the clock value of the presentation time stamp of the current frame and the clock value of the presentation time of the previous frame. Noting that the coded frames are normally transmitted in the order F1(I), F4(P), F2(B), F3(B), etc., if there are no discontinuities in the presentation time stamps of the frames the sequence of values of Diff for frames F4, F2 and F3 will be +3*frame interval, –2*frame interval, and +1*frame interval.

The algorithm also updates the value of the variable Clock_pts to the value PTS for the current frame, so that it will be available for calculating Diff for the next frame, and updates the value (ST*+Int_fr) to the variable ST* so as to store the most recent ST*. Therefore, the stream time stamp for the current frame is equal to the stream time stamp of the previous frame plus an improvised value of the frame interval, Int_fr.

Assuming no wrap around of the presentation time stamp (which will be discussed below) execution of the algorithm passes to the decision block 130 at which the algorithm tests whether the absolute value of Diff is less than or equal to TOL. Since TOL is equal to three times the frame interval, if the test evaluates true we assume that there is no discontinuity in presentation time stamps; otherwise there is a discontinuity.

In the event of a discontinuity, in step 140 the algorithm updates the variable ST_dis* with the value of ST* for the current frame and updates the variable Clock_start with the value of PTS for the current frame. In this manner, the variable ST_dis* stores the value of the stream time stamp of the first frame after a discontinuity in the presentation time stamp and the variable Clock_start stores the presentation time stamp for the first frame after a discontinuity in the presentation time stamp. The point of discontinuity in the recorded stream is thereby marked for subsequent calculations.

In step 150 the algorithm stores frame information (such as presentation time stamp, frame offset from the start of the video stream, and frame offset from the I frame at the start of the current GOP) and the stream time stamp of the current frame in the index file. The read/write controller stores the actual video frame data of the current frame and the content offset value in the content file.

If there is no discontinuity in the presentation time stamp, execution proceeds to the decision block 160 in which the frame type is tested to determine whether the current frame is a reference frame. If the current frame is not a reference frame, the algorithm confirms (block 170) that the frame is a B frame and checks (block 180) whether a B frame flag is set true.

If the B frame flag is true, indicating that the previous frame was a B frame, the algorithm checks (step 190) whether Diff is greater than Int_min. As noted above, Diff is equal to the difference between the presentation time stamp of the current frame and the presentation time stamp of the previous frame. In a well-behaved sequence, B frames are always received in order and the frame interval between two consecutive frames that are B frames directly reflects the current frame rate of the sequence, even in the case of a varying frame rate as occurring in 2:3 pull down (telecined) video. Diff is therefore a reliable value of the current frame interval. If Diff is greater that Int_min, the algorithm updates Int_fr to the current value of Diff. The algorithm also updates TOL to reflect the updated value of Int_fr. Thus, the algorithm repeatedly calculates a most current improvised frame interval, Int_fr, that is continuously updated (generally every four frames) so that when the next frame is received, the value of Int_fr that is used is accurate in step 120 to update ST*. The algorithm writes the frame information and the associated ST* value to the index file (step 150).

If the current frame is a B frame and block 180 determines that the B frame flag is false, indicating that the previous frame was not a B frame, the algorithm sets the B frame flag true (block 200) and writes the frame information and the associated ST* value to the index file (step 150).

If block 170 determines that the current frame is not a B frame, the algorithm resets the B frame flag false (block 210) and writes the frame information and the associated ST* value to the index file (step 150).

If block 160 determines that the frame is a reference frame, the algorithm checks whether Diff is greater than Int_min (step 220) and, if so, adjusts ST* to (Clock_pts−Clock_start+ST_dis*). If there had been no previous discontinuity in the sequence, ST_dis* would be zero and Clock_start would be equal to the clock time of the first frame based on the presentation time stamp. Thus, ST* would be adjusted to the value of Clock_pts, offset by the value of Clock_start. If there had been a previous discontinuity, ST_dis and Clock_start would reflect the values of the first frame after the most recent discontinuity. In this manner, ST* is dynamically adjusted so that discontinuities in the presentation time stamp do not affect the evolution of the value of ST*. Since the frame is a reference frame, the algorithm resets the B frame flag false. The algorithm writes the frame information and the associated ST* value to the index file (step 150).

If the presentation time stamp started at zero at the beginning of the sequence of coded video frames, it would take over 24 hours to wrap around back to zero. The likelihood of a sequence being sufficiently long for this to happen is very small. However, the presentation time stamp does not necessarily start at zero and therefore it is necessary to check (block 230) whether the presentation time stamp for the current frame has wrapped around from the PTS for the previous frame and, if so, adjust the value of Diff (block 240) by subtracting the value of PTS for the previous frame from the sum of the value of PTS for the current frame plus the maximum value of PTS.

It will be appreciated that the stream time stamp increases monotonically from zero throughout the sequence as it is recorded, without repetition and with increments being based strictly on the current frame interval. Since the stream time starts at zero the possibility of a wrap around occurring during a recording is virtually non-existent.

Figure 3:
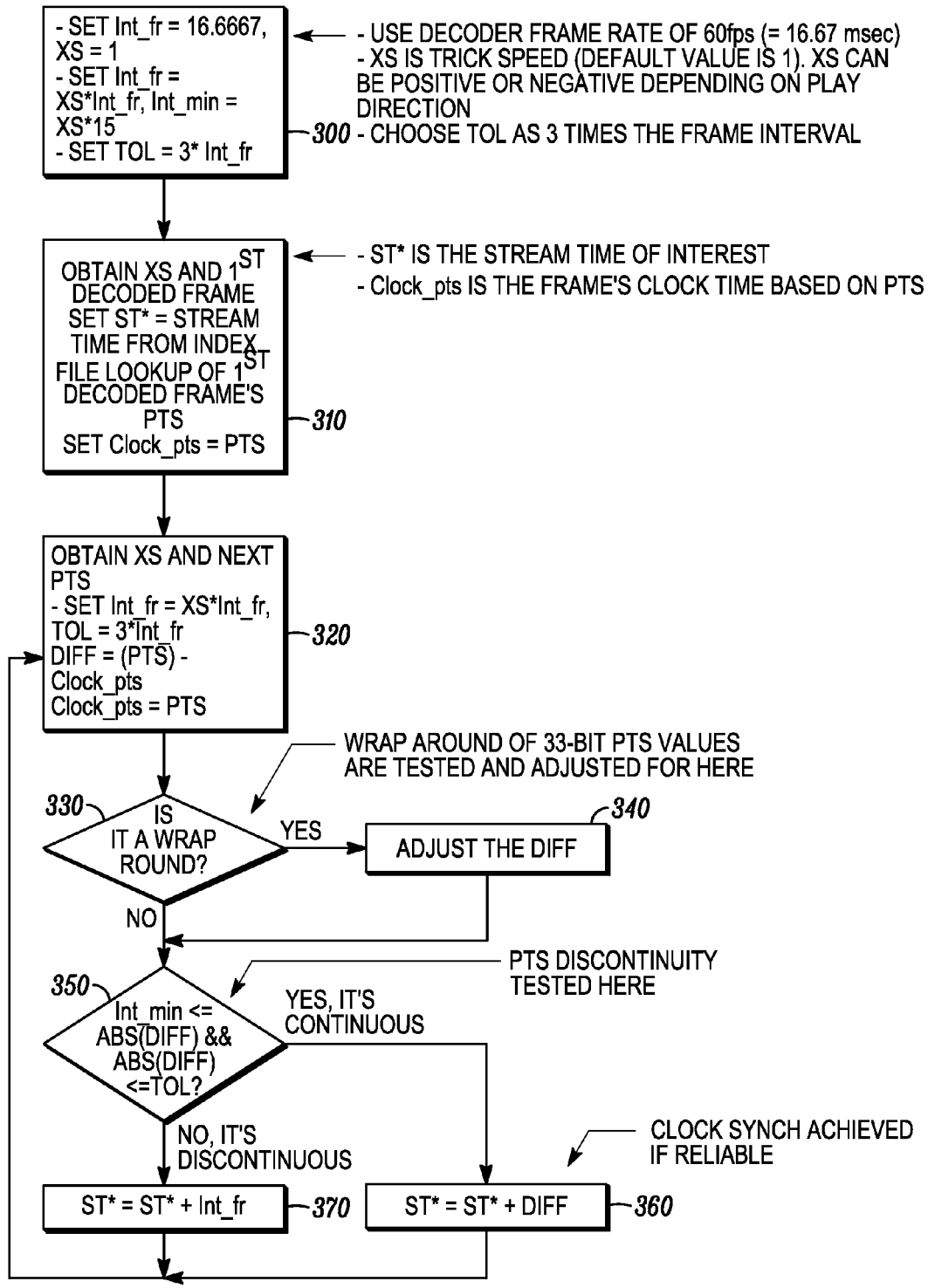
FIG. 3 is a flow chart of an algorithm that is executed by the receiving terminal shown in FIG. 1 during playback of the recorded sequence.

On playback, the read/write controller executes the algorithm shown in FIG. 3. As shown in FIG. 3, at the beginning of playback the algorithm is initialized (step 300) by setting variables Int_fr (frame interval) equal to 16.6667 ms, a variable XS (trick speed) equal to 1, Int_fr equal to XS*Int_fr, Int_min (minimum frame interval) equal to XS* 15 ms, and TOL (tolerance) equal to 3*Int_fr. The algorithm receives (block 310) a user-specified value of trick speed from a user interface.

The frame that will be decoded first on playback is indeterminate. In order to make an appropriate choice for the first frame to be decoded, the algorithm performs a lookup of PTS value in the index file and selects the PTS value for a frame in an initial segment of the sequence of recorded frames based on the stream time stamp value, it being recalled that ST* starts with zero at the beginning of the recorded sequence. The algorithm sets a variable ST* equal to the stream time stamp of the selected first frame and sets a variable Clock_pts (the frame's clock time based on presentation time stamp) equal to PTS.

In step 320, the algorithm tests and, if necessary, updates the value of XS and updates PTS with the presentation time stamp of the next frame. The algorithm updates the value of Int_fr using the updated value of XS and updates the value of TOL using the updated value of Int_fr. The algorithm assigns the value PTS−Clock_pts to a variable Diff and updates Clock_pts with the value of PTS for the current frame.

In decision block 330 the algorithm checks whether there is a wrap around of PTS values, as described above in connection with FIG. 2, and if so adjusts (step 340) the value of Diff accordingly, as also described with reference to FIG. 2. The algorithm then checks (block 350) whether the PTS values are continuous. If the values are continuous, the algorithm sets ST* equal to ST*+Diff (step 360); if the values are not continuous, the algorithm sets ST* equal to ST*+Int_fr (step 270). The read/write controller compares the updated value of ST* with values of ST stored in the index file, identifies a corresponding value in the index file (using appropriate rules), and uses that value to read the coded video frame data from the content file.

As mentioned above, the values of the stream time stamp generated by the algorithm described with reference to FIG. 2 increase monotonically from zero during the sequence as it is recorded. Consequently, using the algorithm described with reference to FIG. 3 to generate values of ST during playback ensures that the values of ST that are used to read coded video frame data from the content file will increase monotonically during forward play and will decrease monotonically during reverse play, and the difference between two consecutive values will always be at least as great as the most recent frame interval.

The decoder decodes the frames based on DTS and presents the frames based on PTS, as conventional.

As noted previously, the presentation time stamp is a 33 bit number. In practical implementations of the algorithms described above, it is preferred that 32 bit numbers be used. Accordingly, each algorithm drops the least significant bit from the presentation time stamp, which is equivalent to calculating the PTS value as the number of ticks of a 45 kHz clock. The PTS values that are stored in the index file are 32 bit numbers.

Figure 4:
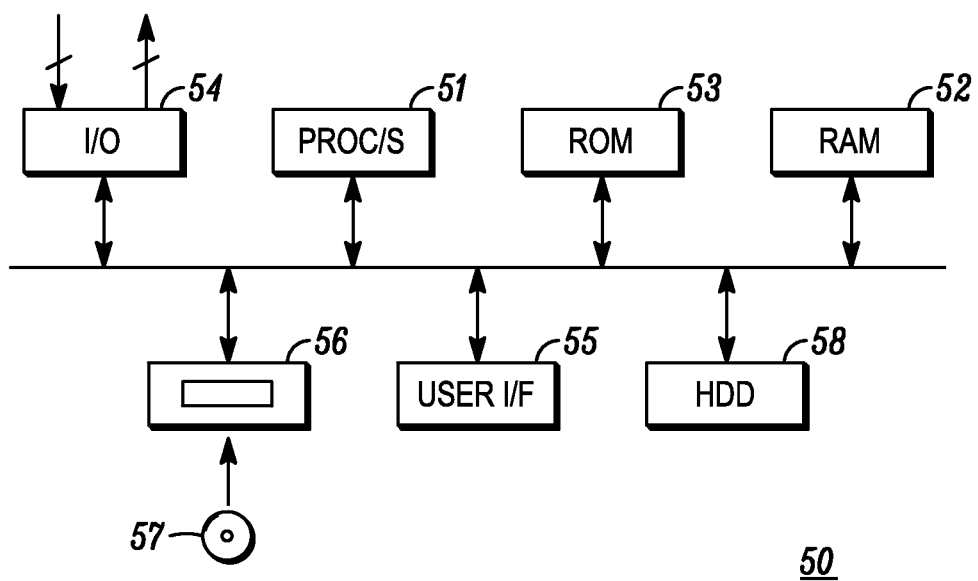
FIG. 4 is a schematic block diagram of a computer that may be used to implement the receiving terminal shown in FIG. 1.

Referring to FIG. 4, a suitable receiving terminal may be implemented as a special purpose computer 50 comprising one or more processors 51, random access memory 52, read-only memory 53, I/O devices 54, a user interface 55 and a hard disk drive 58, configured in a generally conventional architecture. The computer operates in accordance with a program that is stored in a non-transitory computer readable medium, such as the hard disk drive 58 or a CD-ROM 57, and is loaded into the random access memory 52 for execution. The program is composed of instructions such that when the computer receives a bitstream representing a sequence of video frames coded in accordance with the MPEG-2 algorithm, by way of a suitable interface included in the I/O devices 54, the computer allocates memory to appropriate buffers and utilizes other suitable resources and functions to perform the various operations that are described above as being performed by the receiving terminal.

It will be appreciated by those skilled in the art that the program might not be loadable directly from the CD-ROM 57 into the random access memory utilizing the CD-ROM drive 56 and that generally the program will be stored on the CD- ROM or other distribution medium in a form that requires the program to be installed on the hard disk drive 58 from the CD-ROM 57.

It will be appreciated that the subject matter claimed herein is not restricted to the particular embodiment that has been described, and that variations may be made therein without departing from the scope of the subject matter defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of modifying a digital data stream composed of a sequence of frames, where each frame represents an image and includes a data field specifying a presentation time stamp value for the frame, comprising:
   a. initializing a first variable with a frame interval value based on a nominal frame rate;
   b1. receiving a first frame and reading the presentation time stamp value of the first frame;
   b2. assigning, to a second variable, the presentation time stamp value of the first frame;
   b3. assigning, to a third variable for representing the first frame's clock time based on presentation time stamp, the value of the second variable;
   b4. assigning, to a fourth variable for representing a frame's clock time based on presentation time stamp, the value of the second variable;
   b5. assigning, to a fifth variable for representing a stream time stamp of interest, a value of zero;
   c1. receiving a next frame and reading the presentation time stamp value of said next frame;
   c2. assigning, to the second variable, the presentation time stamp value of said next frame;
   c3. assigning, to a difference variable, the value of the second variable minus the fourth variable;
   c4. assigning, to the fourth variable, the value of the second variable;
   c5. assigning, to the fifth variable, a sum of the values of the fifth variable and the first variable; and
   d. testing whether there is a discontinuity in presentation time stamp value between said next frame and the previous frame and, if so:
      assigning, to a sixth variable for representing the value of the stream time stamp of interest at a point of discontinuity in presentation time stamp, the value of the fifth variable;
      assigning, to the third variable, the value of the second variable; and
      storing said next frame in a database using the value of the fifth variable as an index.

2. A method according to claim 1, wherein the sequence of frames is composed of P frames, I frames and B frames, and step a. further comprises initializing a seventh variable with a minimum frame interval value based on said nominal frame rate, and the method further comprises, if there is no discontinuity in presentation time stamp value between said next frame and said previous frame, testing whether said next frame is either of a P frame or an I frame and, if so, and if the value of the difference variable is greater than the value of the seventh variable, assigning to the fifth variable the value of the fourth variable minus the third variable plus the sixth variable.

3. A method according to claim 1, wherein the sequence of frames is composed of P frames, I frames and B frames, and the method further comprises, if there is no discontinuity in presentation time stamp value between said next frame and said previous frame, testing whether said next frame is a B frame.

4. A method according to claim 3, further comprising, if said next frame is not a B frame, resetting a B frame flag false.

5. A method according to claim 3, further comprising, if said next frame is a B frame, testing whether a B frame flag is set true.

6. A method according to claim 5, further comprising, if said B frame flag is not set true, setting said B frame flag true.

7. A method according to claim 5, wherein step a. further comprises assigning a value to a tolerance variable and step d. further comprises testing whether the absolute value of the difference variable exceeds the value of the tolerance variable, and the method further comprises, if said B frame flag is set true, assigning the value of the difference variable to the first variable and assigning the value of the first variable multiplied by three to the tolerance variable if the difference variable is greater than the seventh variable.

8. A non-transitory computer-readable storage medium comprising stored instructions which, when executed by one or more processors, cause the one or more processors to perform the method of claim 1.

* * * * *